Nov. 27, 1934.        R. L. WILCOX        1,982,460
TRANSFER MECHANISM
Filed Feb. 17, 1934        2 Sheets-Sheet 1
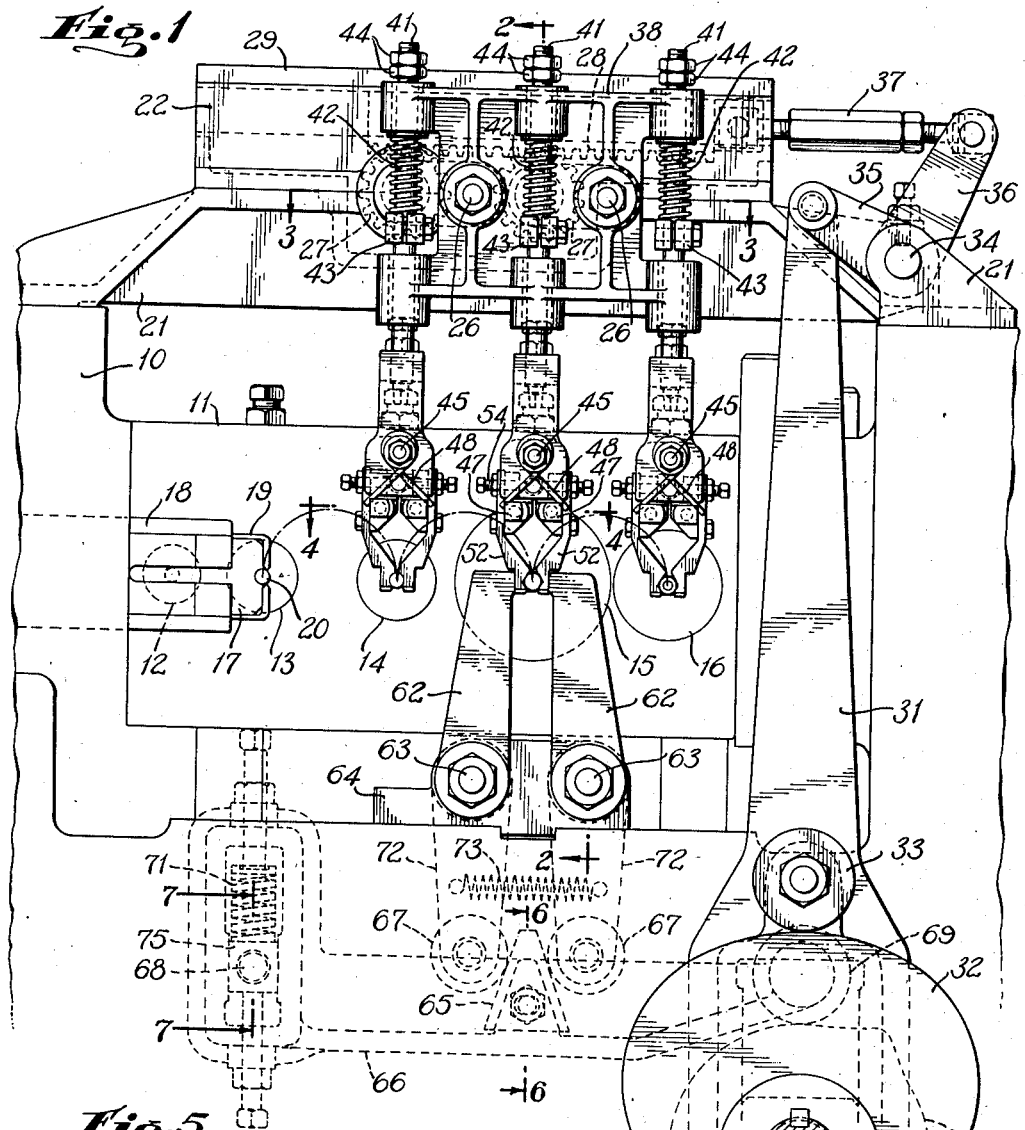

Nov. 27, 1934.    R. L. WILCOX    1,982,460
TRANSFER MECHANISM
Filed Feb. 17, 1934    2 Sheets-Sheet 2
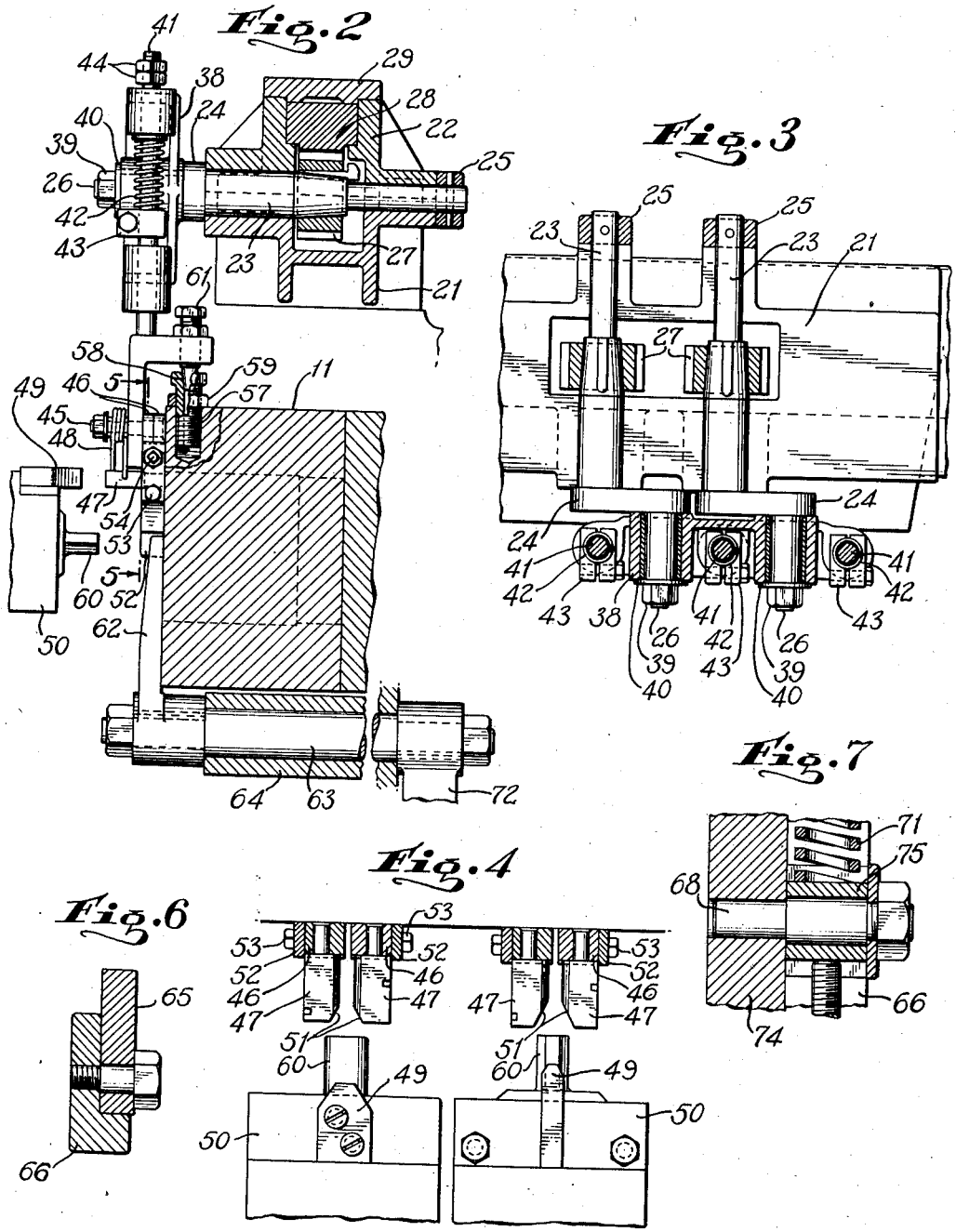
INVENTOR.
RICHARD LESTER WILCOX
BY
ATTORNEY.

Patented Nov. 27, 1934

1,982,460

UNITED STATES PATENT OFFICE 1,982,460

TRANSFER MECHANISM

Richard Lester Wilcox, Waterbury, Conn., assignor to The Waterbury Farrel Foundry and Machine Company, Waterbury, Conn., a corporation of Connecticut Application February 17, 1934, Serial No. 711,767

25 Claims. (Cl. 10—12)

This invention relates to transfer mechanism, and particularly to the type thereof that is used in connection with machinery having several operating stations for taking a workpiece from one station and delivering it to another station.

It is the object of the invention, among other things, to provide means, preferably operable upon one side of the tools, for transferring one or more workpieces successively from one station to another without changing the position of the workpiece about its axis during transit; to so design the mechanism that each transfer unit is independently and separably adjustable, held against movement lateral to the normal path of movement, the extent of movement thereof being variable, and limited positively at one end of the stroke thereof, and so mounted that each unit will not complete its stroke if an obstruction is in the path thereof; to provide for the proper registry of the transfer means with the tools; and in these and other ways, to construct the transfer mechanism so that it may be assembled as a unit independent of the machine to which it may be readily attached and detached, such independent assembly being desirable for replacement of parts; and to provide means whereby at either one or all of the several stations a supplemental grip may be applied to the transfer unit and through it to the workpiece.

To these, and other ends, my invention consists in the transfer mechanism, having certain details of construction and combinations of parts as will be hereinafter described and more particularly pointed out in the claims.

Referring to the drawings, in which like numerals of reference indicate like parts in the several figures;

Figure 1 is a view of the transfer mechanism and a fragmentary portion of a machine with which it may be used advantageously;

Figure 2 is a fragmentary view thereof, the parts in section being taken generally upon line 2—2 of Figure 1;

Figure 3 is another fragmentary view thereof, the parts in section being taken generally upon line 3—3 of Figure 1;

Figure 4 is another fragmentary view thereof, the parts in section being taken generally upon line 4—4 of Figure 1;

Figure 5 is a detail view of the fingers and associated mechanism, the parts in section being taken generally upon line 5—5 of Figure 2;

Figure 6 is a view, in section, upon line 6—6 of Figure 1, of a portion of the jaw actuating mechanism; and Figure 7 is a fragmentary sectional view of Figure 1 of a portion of the rock arm and associated parts.

The machine shown herein, and with which the transfer mechanism is associated, is a header, upsetting machine or the like, for the manufacture of bolts, nuts, rivets and like articles.

In this type of machine a plurality of dies are usually arranged in a straight line, and a portion of a rod is cut therefrom at one die, transferred successively to other dies for operation thereon and finally ejected as a finished product.

It is desirable in such a machine that during the transfer of the workpiece from one station to another that a polygonal blank should not be rotated about its axis, thus making certain that it will register with tools or the like at the next station.

If the tools are in a substantially horizontal plane it is desirable that the transfer mechanism should operate in a plane higher than the tools, so that upon failure of any of the parts to properly function, or if a workpiece should be projected out of proper timing, or the transfer fingers should break and fail to grasp the workpiece, the latter will drop by gravity out of the path of such fingers without injury or damage thereto or to any other parts of the machine.

In the embodiment of the invention as disclosed herein, which is one of the many forms in which the same may be made, 10 indicates the body of the machine, 11 a die block mounted therein, 12, 13, 14, 15 and 16, dies that are held rigidly in the die block, and which are located at the several stations herein referred to. In this machine a rod or wire length is fed through the die 12 and the portion projecting in front thereof is severed by the cutter 17 fixed to a reciprocating cutter bar 18, and by means of the fingers 19 transferred to the die 13.

A tool, usually a punch 60 or the like, projects the severed portion of the rod, now a workpiece 20, into the die 13, where suitable operations are performed thereon. Thereafter, by knockout mechanism or the like, this workpiece is projected outwardly from the die 13 into the path of fingers on the transfer mechanism, as herein described. By this transfer mechanism the workpiece is carried to the die 14, operations are performed thereon, then by knockout mechanism ejected therefrom, and by similar transfer fingers carried to the next die 15 and subsequently to the die 16, and until all of the operations are completed. In this disclosure four dies other than the cut-off die are shown, but a greater or less number may be used as preferred.

Secured to the body 10 is a platform 21, upon which is secured a casing 22, in both of which are journaled two crank shafts 23 that are held against endwise movement by the crank arms 24 at one end and the collars 25 at the other end. Fixed to each crank arm is a crank pin 26, and on each crank shaft is a pinion 27. Suitably mounted in the casing 22 is a rack 28, the teeth of which mesh into those of the pinions 27. A cover plate 29 closes the casing upon one side and also forms a bearing for the rack. This rack has a reciprocating movement derived from the cam 32 on the shaft 30 through a connection 31, the cam rolls 33 on the connection maintaining peripheral contact with the cam.

Rotatable upon a shaft 34 in the platform 21 is a bell crank, one arm 35 of which is connected with the connection 31, and the other arm 36 through a turn buckle 37, with the rack 28. Thus, rotation of the shaft 30 through the rack 28 imparts rotary movement to the crank shafts 23, the extent of this movement being preferably slightly more than 180°. A carrier frame 38 is mounted on the crank pins 26, and held against disengagement thereon by the nuts 39 and washers 40. Rotation of the crank shafts 23 moves the carrier frame through an arc of a circle approximating 180°. Movably mounted within the carrier frame are a plurality of finger supports 41, surrounding a portion of each of which is a compression spring 42, the tension of which is varied by the adjustable split collars 43, and on the upper end of which are threaded the lock nuts 44.

In each support 41 is a stud 45, about which a spring 48 is coiled, and a pair of finger levers 46 are mounted. Each finger has a stud 47 that is engaged by an end portion of a spring 48 that tends to hold and move the levers toward each other. Each pair of finger levers are separated positively by a cam plate 49 or the like on a punch block 50 or the like. This latter being usually associated with a reciprocating member (not shown) of the machine, such as a gate or ram. The engagement of the cam plate 49 with the cam faces 51 on the studs 47 during the movement of the said reciprocating member in one direction separates the finger levers.

The transfer fingers 52 are secured to finger levers 46 by screws 53 and 54, the inner ends of the latter screws being in engagement with a stud 55 fixed in a finger support 41. Adjacent faces at the outer end of the fingers 52 are each provided with recesses 56, within which the workpiece is held during transfer. The shape of these recesses varies to accommodate the workpiece. For illustration, the recesses as shown are designed for transfer of a workpiece that in its completed form is substantially hexagonal in cross section. The fingers shown at the left in Figure 1 have semi-circular recesses and the other fingers have recesses with angular walls to conform with the varying shape of the workpieces in process. The spacing between the outer ends of these fingers and their relative lateral position may be varied by adjustment of the screws 54 in a well known manner. Such lateral adjustment of the fingers insures a proper registry of the recesses 56 with the opening in the dies if the same are not in exact alignment with the finger supports.

Threaded in the die block 11, adjacent to each finger support, is a screw plug 57 having a conical recess 58 at one end and held in its various positions by a lock nut 59. Adjustable in a lug connected with the finger supports 41 is a screw 61, having a conical end which registers with the recess 58. As the several pairs of fingers approach a position wherein the recesses register with the opening in the several dies the conical end of the screws 61 enters the conical openings 58 and stops the movement thereof. Thus, variation of the position of the plug 57 and screw 61 permits a close adjustment of the fingers and their relative positions whereby the recesses 56 may be brought into exact register with the workpiece, and it is not essential that the dies should be in exactly the same plane.

By this mechanism an independent adjustment of each finger support is obtainable.

The carrier frame lifts the several finger supports from the stations as the top of the frame engages the lock nuts 44, which are spaced from the frame to give independent adjustment to each finger support.

In operation the fingers 52 move as a unit through a semi-circular path from one die to the next die, these several paths being outlined in broken lines in Figure 1. The fingers 52 cannot be moved outwardly away from the face of the die block 11 when the screw 61 and plug 57 are in engagement with each other, thus preventing damage to any of the parts if perchance a workpiece does not register with the recesses 56, but contacts with a face of the fingers.

When in register with a die the fingers receive a workpiece that is projected therebetween by suitable knockout mechanism (not shown). Thereafter, during travel of the carrier frame 38 each pair of fingers carries a blank to the next die in the series where it is projected into the die by the punch 60, or the like, at that station.

The carrier frame may continue its motion until it has traveled through a path slightly more than 180° irrespective of the time during such travel that the finger supports, either individually or as a unit, come to a full stop.

The shape of the cam 32 is such that immediately after a workpiece has entered the dies sufficiently by sliding through the fingers, the latter move away from the station and out of the path of the tools.

More or less transfer fingers may be associated with the carrier frame 38 as may be desired or required. The transfer mechanism shown herein will grasp the workpiece, if polygonal in cross section at one station and transfer it to the next succeeding station and deliver it at the latter station in the same relative position thereto as at the previous station and without rotation thereof about its axis. For a workpiece having a polygonal cross section this is quite desirable, otherwise the workpiece will not suitably register with the tools at the succeeding station. It is desirable in some operations that the fingers hold the workpiece under a pressure greater than required during transfer. Mechanism to produce this result comprises the companion jaws 62 mounted upon rock shafts 63, rotatable in a fixed part 64, rock arms 72 on the shaft 63 carrying anti-friction rolls 67, a rock arm 66, a wedge 65 on the latter that is projected between the cam rolls 67, and a spring 73 which tends to maintain the cam rolls in contact with the faces of the wedge 65. The rock arm 66 is fulcrumed on a stud 68 secured in a fixed part 74, or the like, and carries a cam roll 69 which rides against the cam 70 on the shaft 30. A slide block 75 on the stud 68 provides a convenient support for the spring 71 and the rock arm 66. Thus, as the fingers 52 are brought into register at a station, they project between the jaws of the tongs 62. At the same time the wedge 65 is projected between the rolls 67 and move the outer ends of the jaws together and apply pressure to the ends of the fingers therebetween. One set of these tongs is shown in the drawings, but additional sets of tongs may be added at other stations if desired. A spring 71 in the rock arm 66 yields when the wedge 65 applies the requisite pressure to the fingers 52.

Within the scope of the appended claims, minor changes and alterations may be made within the particular embodiment of the invention, shown herein.

What is claimed as new is,—

1. In a machine of the character described; a plurality of dies; means for transferring a workpiece from one die to another die, comprising in part gripping fingers, and mechanism carrying said fingers and capable of movement through a path slightly greater than the path of movement required for the gripping fingers, said gripping fingers being independently movable relative to said mechanism.

2. In a machine of the character described; a plurality of dies; means for transferring a workpiece from one die to another die, having gripping fingers forming part thereof, by mechanism that has movement slightly greater than the path of movement required for the fingers; and means for limiting the extent of movement of the fingers irrespective of the extent of movement of said mechanism.

3. In a machine of the character described; a plurality of dies; means for transferring a workpiece from one die to another die, having gripping fingers forming part thereof, said means comprising in part a carrier member; a finger support movably mounted in the carrier member; and means connected in part with said support for adjustably limiting the extent of movement of said support within the carrier member.

4. In a machine of the character described; a plurality of dies; means for transferring a workpiece from one die to another die, having gripping fingers forming part thereof, said means comprising in part a carrier member; a finger support movably mounted in the carrier member; and interlocking elements adjustable in relation to each other for adjustably limiting the extent of movement of said support within the carrier member, one of said elements being connected with said support.

5. In a machine of the character described; a plurality of dies; means for transferring a workpiece from one die to another die, having gripping fingers forming part thereof, said means comprising in part a carrier member; a finger support movably mounted in the carrier member; and interlocking elements adjustable in relation to each other for adjustably limiting the extent of movement of said support within the carrier member, one of said elements being connected with said support, and each of the elements having an angular wall in engagement with each other.

6. In a machine of the character described; a plurality of dies; means for transferring a workpiece from one die to another die, having gripping fingers forming part thereof, said means comprising in part a carrier member; a finger support movably mounted in the carrier member and with which the gripping fingers are movably connected; and means independent of said fingers for applying pressure thereto when the same are in register with the opening in a die.

7. In a machine of the character described; a plurality of dies; means for transferring a workpiece from one die to another die, having gripping fingers forming part thereof, said means comprising in part a carrier member; a finger support movably mounted in the carrier member; means independent of said fingers for applying pressure thereto when the same are in register with the opening in a die, comprising jaw members in the path of movement of the fingers, between which the same are projected; and means for actuating said jaw members to apply pressure to the fingers therebetween.

8. In a machine of the character described; a plurality of dies; means for synchronously transferring workpieces from dies to other dies, comprising a carrier member; plural finger supports movably mounted in said carrier member and with which the gripping fingers are movably connected; and adjustable means for varying the relative position of the finger supports in relation to the dies and the extent of movement of the fingers, comprising in part two members, one connected with the finger support and having an angular wall engagement with the other off the members when in one of their relative positions.

9. In a machine of the character described; a plurality of dies; means for transferring a workpiece from one die to another die having gripping fingers forming part thereof, which move in front of and in a plane parallel with the face of the die; and means for preventing movement of the fingers away from said die in a plane parallel with the axis thereof, comprising in part, a member that travels with the fingers and a fixed part, with which the member registers.

10. In a machine of the character described; a plurality of dies; means for transferring a workpiece from one die to another die having gripping fingers forming part thereof, which move in front of and in a plane parallel with the face of the die; and means whereby during the projection of a workpiece between the fingers they will be held against movement in the same direction as the workpiece, comprising in part, a member that travels with the fingers and a fixed part, with which the member registers.

11. In a machine of the character described; a plurality of dies; means for transferring a workpiece from one die to another die having gripping fingers forming part thereof, said means comprising in part, a carrier member; duplex members for actuating the carrier member through the arc of a circle; and a finger support having axial movement in the carrier member.

12. In a machine of the character described; a plurality of dies; means for transferring a workpiece from one die to another die having gripping fingers forming part thereof, said means comprising in part, a carrier member; duplex members for actuating the carrier member; a finger support having axial movement in the carrier member; and adjustable means for limiting such axial movement.

13. In a machine of the character described; a plurality of dies; means for transferring a workpiece from one die to another die, having gripping fingers forming part thereof, by mechanism that has movement slightly greater than the path of movement required for the gripping fingers; and yielding means for absorbing the excess movement of said mechanism.

14. In a machine of the character described; a plurality of dies; means for transferring a workpiece from one die to another die, having gripping fingers forming part thereof, said means comprising in part a carrier member; a finger support movably mounted in the carrier member; means independent of said fingers for applying pressure thereto when the same are in register with the opening in a die, comprising jaw members in the path of movement of the fingers, between which the same are projected; and wedge means for actuating said jaw members to apply pressure to the fingers therebetween.

15. In a machine of the character described; a plurality of dies; means for transferring a workpiece from one die to another die having gripping fingers forming part thereof, said means comprising in part, a carrier member, companion and substantially parallel crank shafts for actuating the carrier member; and a finger support having axial movement in the carrier member.

16. In a machine of the character described; a plurality of dies; means for transferring a workpiece from one die to another die, having gripping fingers forming part thereof, said means comprising in part, a carrier member; plural finger supports carried by and movably mounted in the carrier member; fingers upon the finger supports; plural members arranged in substantially the same plane having an operative connection with the carrier member; means for imparting movement to said members; and means for separably securing the carrier member to both of said members, whereby the carrier member, finger supports and fingers may be separated as a unit from the said plural members.

17. In a machine of the character described; a plurality of dies; means for transferring a workpiece from one die to another die, having gripping fingers forming part thereof, said means comprising in part a carrier member; a finger support movably mounted in the carrier member; means independent of said fingers for applying pressure thereto when the same are in register with the opening in a die, comprising jaw members in the path of movement of the fingers, between which the same are projected; and means for actuating said jaw members to apply pressure to the fingers therebetween, comprising in part a cam, a rock lever, and a wedge element.

18. In a machine of the character described; a plurality of dies; means for transferring a workpiece from one die to another die having gripping fingers forming part thereof; and means for holding said fingers against movement lateral to the transfer movement, comprising intermeshing mechanism, a portion of which is movable and a porton rigid.

19. In a machine of the character descrbed; a plurality of dies; means for transferring a workpiece from one die to another die, having gripping fingers forming part thereof; means for limiting the movement of the gripping fingers in one direction, whereby the gripping fingers may positively register with the die openings and prevent movement of the fingers lateral to the transfer movement thereof, said means having a fixed part and a movable part.

20. In a machine of the character described; a plurality of dies; means for transferring a workpiece from one die to another die, having gripping fingers forming part thereof, said means comprising in part a carrier member; a finger support movably mounted in the carrier member; means, for limiting the movement of the finger support in the carrier member when the fingers are in proper register with the dies and means for adjusting the position of the gripping fingers relative to the finger support.

21. In a machine of the character described; a plurality of dies; means for transferring a workpiece from one die to another die, having gripping fingers forming part thereof, said means comprising in part a carrier member; a finger support movably mounted in the carrier member; means for adjusting the position of the gripping fingers relative to the finger support; and means for adjustably limiting the extent of movement of the support relative to the carrier member.

22. In a machine of the character described; a plurality of dies; means for transferring a workpiece from one die to another die, said means comprising in part a carrier member; a finger support movable in the carrier member during the travel thereof; gripping fingers carried by the finger support; and means for adjusting both the fingers and finger support relative to the carrier member, whereby the fingers may be brought into register with the opening in the dies.

23. In a machine of the character described; a plurality of dies; means for transferring the workpiece from one of the dies to another die, comprising a gripping device; a movable member with which the gripping device is connected; and means, other than said member, to register the gripping device with the dies.

24. In a machine of the character described; a plurality of dies; means for transferring the workpiece from one of the dies to another die, comprising a gripping device; a movable member with which the gripping device is connected; and means whereby the gripping device may register with the dies irrespective of the extent of movement of said member.

25. In a machine of the character described; a plurality of dies; a carrier member; a finger support in the carrier member; fingers upon the finger support; actuating means for imparting movement to the carrier member; and means for operatively connecting the carrier member, supports and gripping fingers as a unitary structure to said actuating means, said fingers being mounted so as to move as a unit relatively to the carrier member when engaging a transitory element, if said fingers are not in proper position relative to said transitory element.

RICHARD LESTER WILCOX.